(12) United States Patent
Wang et al.

(10) Patent No.: US 10,684,651 B2
(45) Date of Patent: Jun. 16, 2020

(54) ELECTRONIC DEVICE

(71) Applicant: ASUSTeK COMPUTER INC., Taipei (TW)

(72) Inventors: Yi-Ou Wang, Taipei (TW); Wei-Ting Wong, Taipei (TW); Hao-Ting Hung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/394,126

(22) Filed: Apr. 25, 2019

(65) Prior Publication Data
US 2020/0089278 A1    Mar. 19, 2020

(30) Foreign Application Priority Data

Sep. 19, 2018   (TW) .............................. 107212803 U (51) Int. Cl.
| | | |
|---|---|---|
| *G09G 1/00* | (2006.01) | |
| *G06F 1/16* | (2006.01) | |
| *G06F 3/044* | (2006.01) | |
| *H05K 5/02* | (2006.01) | |
| *G06F 3/041* | (2006.01) | |
| *H05K 5/00* | (2006.01) | |

(52) U.S. Cl.
CPC ............ *G06F 1/1643* (2013.01); *G06F 1/169* (2013.01); *G06F 3/044* (2013.01); *G06F 3/0412* (2013.01); *H05K 5/0017* (2013.01); *H05K 5/0213* (2013.01)

(58) Field of Classification Search
CPC .................................. G06F 1/16; G06F 3/041
See application file for complete search history.

(56) References Cited

U.S. PATENT DOCUMENTS

| | | | | |
|---|---|---|---|---|
| 2012/0268399 A1* | 10/2012 | Cheng | ................... | G06F 1/1649 |
| | | | | 345/173 |
| 2013/0278612 A1* | 10/2013 | Holman | ............... | G02B 6/0031 |
| | | | | 345/501 |
| 2017/0069692 A1* | 3/2017 | Lee | ........................ | H01L 27/323 |
| 2019/0148466 A1* | 5/2019 | Guo | ..................... | H01L 27/3232 |
| | | | | 345/694 |

* cited by examiner

*Primary Examiner* — Michael A Faragalla
(74) *Attorney, Agent, or Firm* — McClure, Qualey & Rodack, LLP (57) ABSTRACT

An electronic device is disclosed, including a case, a supporting structure, a touch module, a protecting layer and a light emitting unit. The case has an opening. The supporting structure is connected to and disposed in the case. The touch module is connected to the supporting structure. The protecting layer is stacked on the touch module and exposed to the opening, and the protecting layer is separated from the case. The light emitting unit is disposed between the touch module and the protecting layer. Thereby, in the electronic device of the disclosure, a space below the protecting layer is effectively utilized, thereby reducing the size of the electronic device and being convenient for a user to carry, and also reducing the time and cost required for the assembly of the electronic device.

12 Claims, 9 Drawing Sheets

ELECTRONIC DEVICE

CROSS-REFERENCE TO RELATED APPLICATION

This application claims the priority benefit of Taiwan Application Serial No. 107212803, filed on Sep. 19, 2018. The entirety of the above-mentioned patent application is hereby incorporated by reference herein and made a part of specification.

BACKGROUND OF THE INVENTION

Field of the Invention

The invention relates to an electronic device.

Description of the Related Art

In general, a notebook computer is mainly provided with a display screen and a host case, and equipped with a mouse and/or a touchpad. The surface of the host case close to the display screen is a control panel. The control panel is provided with a keyboard and the touchpad. By operating the keyboard and/or the touchpad, information is input into the notebook computer, and the corresponding information is displayed by the display screen.

BRIEF SUMMARY OF THE INVENTION

The invention is directed to an electronic device in which a space below a protecting layer is effectively utilized, thereby reducing the size of the electronic device and being convenient for a user to carry.

According to an aspect of the disclosure, an electronic device is provided herein. The electronic device includes: a case having an opening; a supporting structure connected to and disposed in the case; a touch module connected to the supporting structure; a protecting layer stacked on the touch module and exposed to the opening, and separated from the case; and at least one light emitting unit disposed between the touch module and the protecting layer.

In summary, in the electronic device of the disclosure, the light emitting unit is located between the protecting layer and the touch module. Therefore, a space below the protecting layer is effectively utilized, thereby reducing the size of the electronic device and being convenient for the user to carry. Moreover, in the electronic device of the disclosure, the light emitting unit is located between the protecting layer and the touch module instead of being disposed side by side on the periphery of the touch module. Therefore, it is allowed that the light emitting unit is firstly mounted on the touch module, and then mounted in the case of a second body, thereby reducing the time and cost required for the assembly of the electronic device. Furthermore, in the electronic device of the disclosure, the heat dissipation layer is able to uniformly dissipate heat generated by the light emitting unit thereon to lower the temperature at a position adjacent to the light emitting unit in the second body. Therefore, under the condition of the foregoing structure, it is allowed to dispose more light emitting units on the touch module, such that light transmitted from the protecting layer is more saturated and/or more varied.

BRIEF DESCRIPTION OF THE DRAWINGS

To make the foregoing and other objectives, features, advantages, and embodiments of the disclosure more comprehensible, descriptions of the accompanying drawings are as follows.

DETAILED DESCRIPTION OF THE EMBODIMENTS

The following description will provide numerous different implementations or embodiments for implementing the subject matter of the disclosure. Specific examples of elements or arrangements will be discussed below to simplify the disclosure. Definitely, these descriptions are merely some examples and the disclosure is not limited thereto. For example, forming a first feature on or above a second feature includes not only embodiments in which the first feature is in direct contact with the second feature, but also embodiments in which there is another feature formed between the first feature and the second feature and the first feature is not in direct contact with the second feature. Further, in the disclosure, reference numerals or expressions may be repeated in different examples. The purpose of repetition is to simplify and clarify the description, rather than to define the relationship between different embodiments and configurations discussed.

Furthermore, spatially relative terms such as "under", "below", "lower than", "on", and "above" are used herein for convenience in describing the relationship between one element or feature and another element or feature in the drawings. Spatially relative terms encompass other orientations of the device in use or operation in addition to the orientations depicted in the drawings. That is, when the orientation of the device is different from that of the drawings (rotated 90 degrees or in other orientations), the spatially relative terms used herein are also to be interpreted accordingly.

Figure 1:
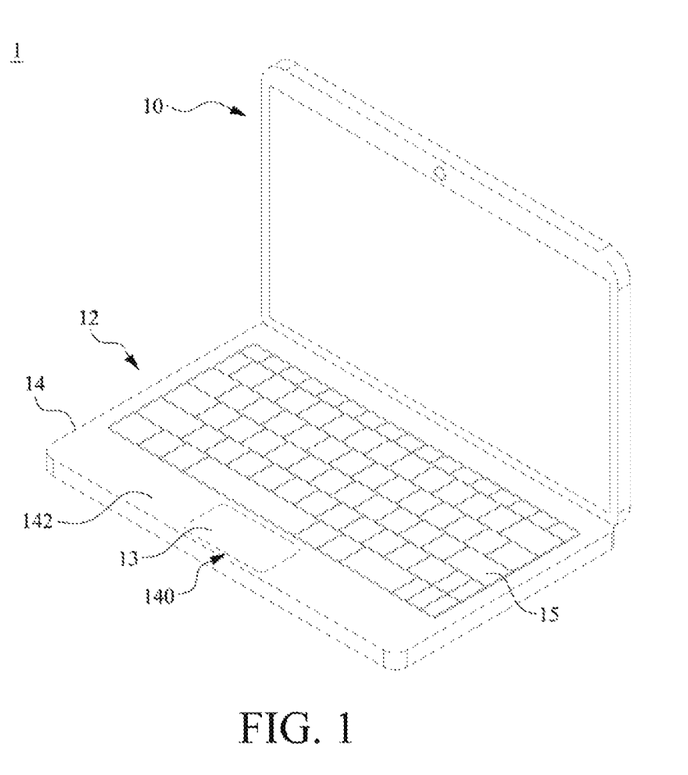
FIG. 1 shows a three-dimensional view of an electronic device according to an embodiment of the disclosure.

Referring to FIG. 1, FIG. 2, FIG. 3A and FIG. 3B, a touch control module 18 (see FIG. 3A and FIG. 3B) in an electronic device 1 is not pressed. As shown in FIG. 1, in this embodiment, the electronic device 1 includes a first body 10 and a second body 12 that are pivotally connected to each other. In FIG. 1, the first body 10 includes a display screen, and the second body 12 includes an input unit, but the disclosure is not limited thereto. In other embodiments, any suitable device is applicable to the first body 10 and/or the second body 12. In this embodiment, the electronic device 1 is a notebook computer, but the disclosure is not limited thereto.

Figure 3A:
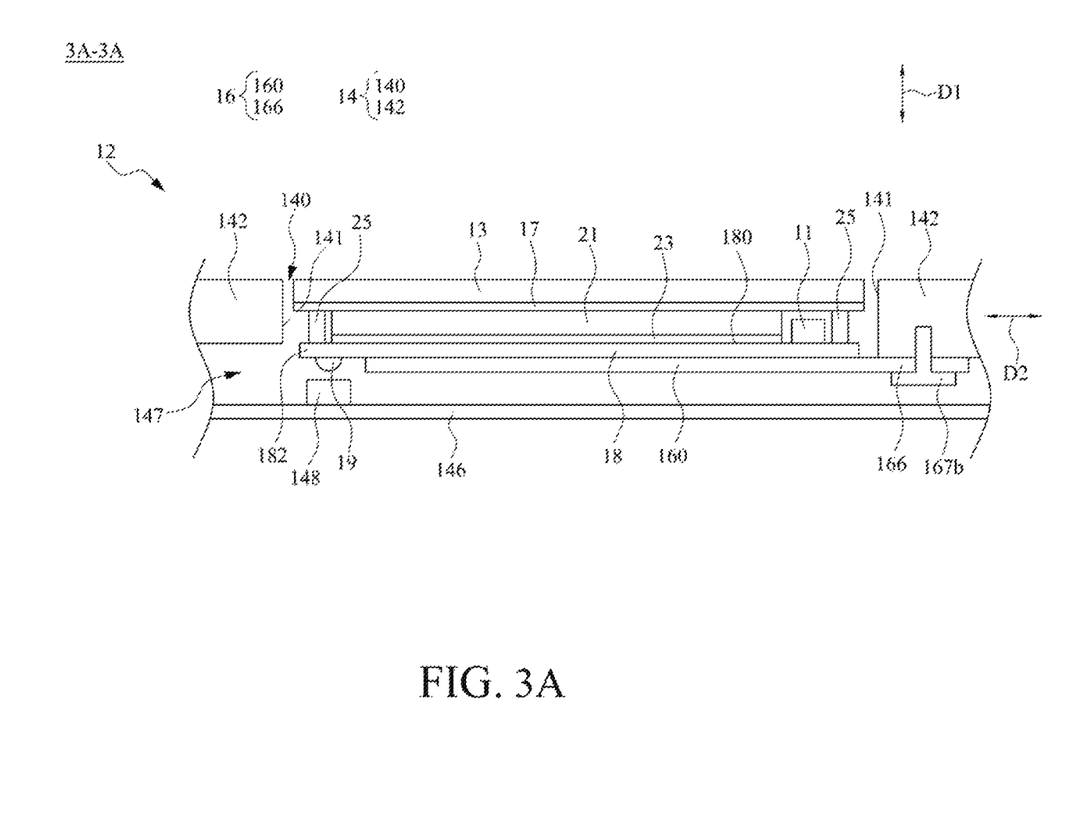
FIG. 3A is a cross-sectional view of the structure shown in FIG. 2 taken along line segment 3A-3A.
Figure 3B:
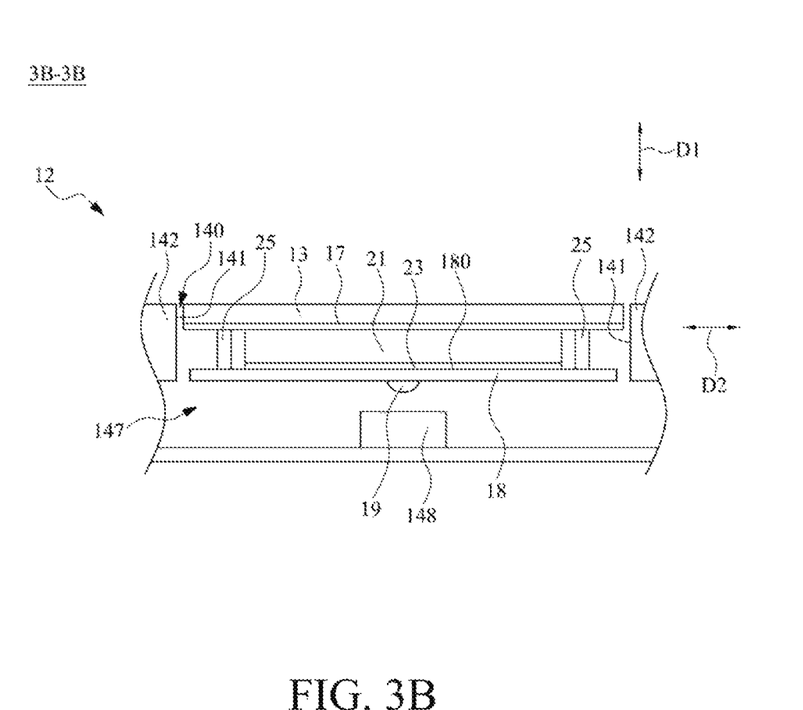
FIG. 3B is a cross-sectional view of the structure shown in FIG. 2 taken along line segment 3B-3B.

As shown in FIG. 1, the second body 12 includes a case 14 and an input unit such as a keyboard assembly 15, a touch control module 18 (see FIG. 3A and FIG. 3B) and the like. As shown in FIG. 3A and FIG. 3B, the second body 12 includes a supporting structure 16, a touch control module 18, a reflecting layer 23, a light guiding layer 21, a patterned stacked structure 17 and a protecting layer 13 that are disposed in the case 14 sequentially, and the second body 12 further includes at least one light emitting unit 11, an elastic switch 19, a light shielding structure 25 and a motherboard (not shown). In some embodiments, every adjacent two of the supporting structure 16, the touch control module 18, the reflecting layer 23, the light guiding layer 21, the patterned stacked structure 17 and the protecting layer 13 are bonded to each other by an optically clear adhesive (OCA) or any other suitable material.

As shown in FIG. 3A and FIG. 3B, the case 14 of the second body 12 includes a top plate 142, a base 146, a pressing member 148, and an opening 140 forms in the top plate 142. An accommodating space 147 is formed between the top plate 142 and the base 146. The keyboard assembly 15 (see FIG. 1) is disposed on the top plate 142 of the second body 12. The pressing member 148 is disposed in the accommodating space 147 of the case 14 and connected to the base 146, but the disclosure is not limited thereto. In some embodiments, the pressing member 148 is connected to the top plate 142 of the case 14. In this embodiment, a direction D1 is perpendicular to the top plate 142 of the case 14.

Figure 2:
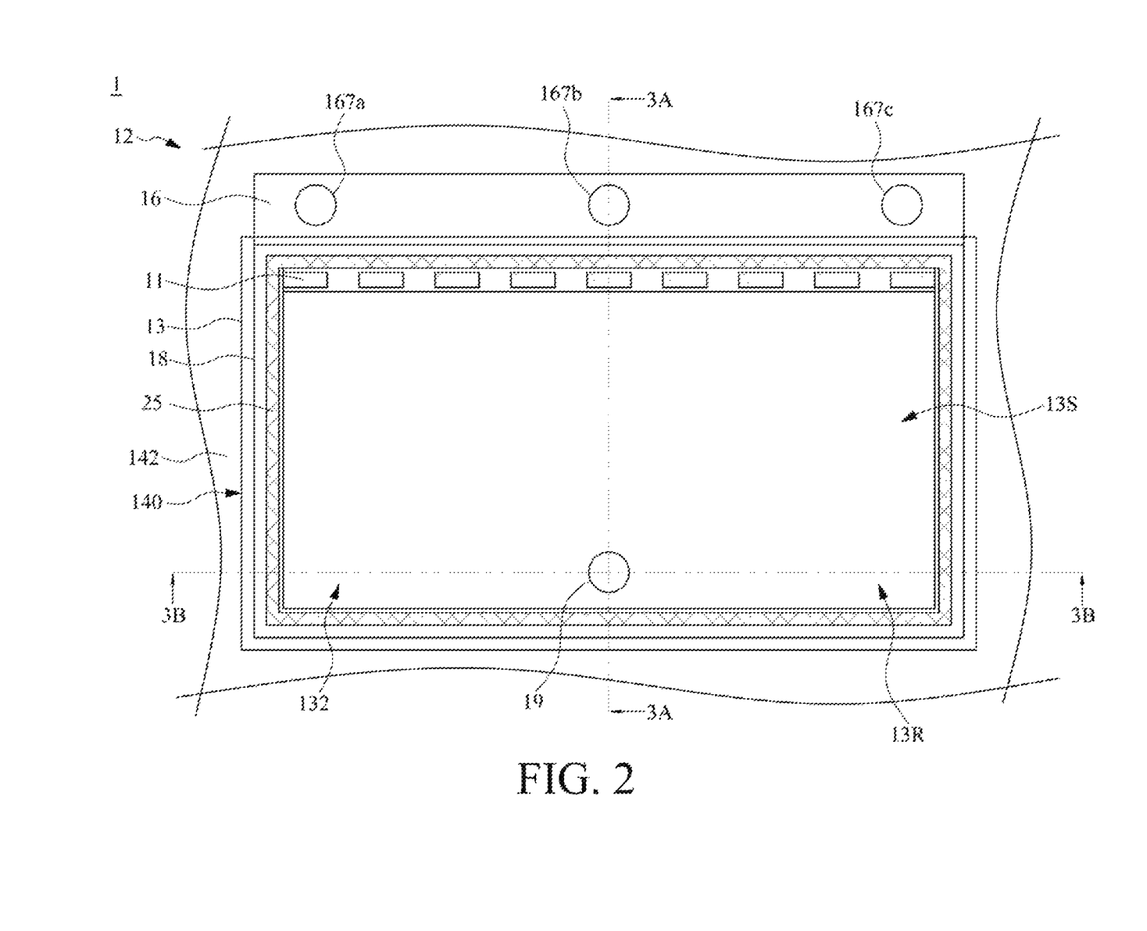
FIG. 2 shows a partial structure top view of an electronic device according to an embodiment of the disclosure.

In FIG. 3A and FIG. 3B, the supporting structure 16 is disposed in the case 14. And, the supporting structure 16 includes a bottom plate 160, a connecting portion 166 and at least one fixing member. As shown in FIG. 2, in this embodiment, the supporting structure 16 has the fixing members 167*a*, 167*b* and 167*c*. In an embodiment, the vertical projection of the bottom plate 160 of the supporting structure 16 on the base 146 partially overlaps the vertical projection of the opening 140 of the case 14 on the base 146. The connecting portion 166 of the supporting structure 16 is connected between the bottom plate 160 and the top plate 142 of the case 14 and fixed to the case 14 by the fixing members 167*a*, 167*b* and 167*c*. In other words, the supporting structure 16 engages the case 14 by the connecting portion 166, and the supporting structure 16 supports the touch control module 18, the at least one light emitting unit 11, the reflecting layer 23, the light guiding layer 21, the light shielding structure 25, the pattern stacked structure 17, the protecting layer 13 and the elastic switch 19 that are disposed thereon. In this embodiment, the fixing members 167*a*, 167*b* and 167*c* include screws, but the disclosure is not limited thereto. In this embodiment, a direction D2 is parallel to the bottom plate 160.

In some embodiments, the supporting structure 16 and the top plate 142 of the case 14 are formed integrally without the fixing members 167*a*, 167*b* and 167*c*. In some embodiments, the supporting structure 16 is formed by a stamping process based on the case 14.

In this embodiment, the supporting structure 16 is configured to move partially away from the opening 140 of the case 14. Specifically, the bottom plate 160 of the supporting structure 16 is a cantilever. That is, an end of the bottom plate 160 of the supporting structure 16 is fixed to the case 14 by the connecting portion 166, and an end of the bottom plate 160 opposite to the connecting portion 166 is movable to get close to or away from the opening 140. When the protecting layer 13 takes a pressure P (see FIG. 3A and FIG. 3B), the supporting structure 16 located below the protecting layer 13 takes the pressure P simultaneously. Therefore, the connecting portion 166 is flexed.

In FIG. 3A and FIG. 3B, the touch control module 18 is connected to the supporting structure 16 and separated from the case 14. In an embodiment, the touch control module 18 is partially disposed on the bottom plate 160 of the supporting structure 16. The touch control module 18 includes a butting portion 182 (see FIG. 3A). The butting portion 182 of the touch control module 18 protrudes from the bottom plate 160 of the supporting structure 16 toward a direction away from the connecting portion 166 and the butting portion 182 is located between the bottom plate 160 and the top plate 142 of the case 14.

In this embodiment, the touch control module 18 senses the touch action of a user, and generates a touch sensing signal corresponding to the touch action when the user approaches or contacts the protecting layer 13. In some embodiments, the touch control module 18 includes a capacitance sensing element. The capacitance sensing element is configured to determine whether a conductor is exist on the protecting layer 13 to generate a touch sensing signal on the touch control module 18.

The capacitance sensing element includes electrodes and/or wires (not shown). When the conductor approaches the protecting layer 13, a capacitance is formed between the conductor and the electrode/wire in the touch control module 18. The capacitance in each electrode/wire is measured by a capacitance sensing circuit or a microcontroller (not shown) in the touch control module 18. That is, the change of capacitance at each electrode/wire is detected by the microcontroller in the touch control module 18 to determine whether a conductor exists above the protecting layer 13. In some embodiments, the touch control module 18 includes a force sensing resistor element, a force sensing capacitor element, a pressure measurement element, a pressure plate or a piezoelectric conversion element.

In some embodiments, the touch control module 18 includes a liquid crystal display (LCD), but the disclosure is not limited thereto. In some embodiments, the touch control module 18 includes an organic light-emitting diode (OLED).

In FIG. 3A and FIG. 3B, at least one light emitting unit 11 is disposed between the touch control module 18 and the protecting layer 13. In FIG. 2, nine light emitting units 11 are shown, but the disclosure is not limited thereto. The light emitting unit 11 of the disclosure is located between the protecting layer 13 and the touch control module 18. Therefore, the space below the protecting layer 13 is effectively utilized, thereby reducing the size of the electronic device 1 and being convenient for the user to carry. Moreover, the light emitting unit 11 of the disclosure is located between the protecting layer 13 and the touch control module 18 instead of being disposed side by side on the periphery of the touch control module 18. Therefore, it is allowed that the light emitting units 11 is firstly mounted on the touch control module 18 in advance, and then the touch control module 18 with the light emitting units 11 is mounted in the case 14 of the second body 12, thereby reducing the time and cost required for the assembly of the electronic device 1.

In FIG. 3A and FIG. 3B, the light emitting units 11 located within the inner edge 141 of the opening 140 of the case 14 is disposed on a top surface 180 of the touch control module 18 and separated from the patterned stacked structure 17. In the direction D2, the light emitting unit 11 and the elastic switch 19 are respectively located on two opposite sides of the touch control module 18.

In this embodiment, the light emitting unit 11 is closer to the fixing members 167*a*, 167*b* and 167*c* of the supporting structure 16 than the elastic switch 19. In other words, in the direction D2, the light emitting unit 11 and the elastic switch 19 are respectively located on two opposite sides of the opening 140, and are respectively adjacent to a part of the inner edge 141 of the opening 140. In this embodiment, as shown in FIG. 2, the light emitting unit 11 is disposed on the touch control module 18 and arranged along the inner edge 141 of the opening 140 of the case 14. In this embodiment, a region of the touch control module 18 configured to dispose the light emitting unit 11 is a touch invalid region. In general, a region of the touch control module 18 adjacent to the upper side of the inner edge 141 of the opening 140 is a region that the user does not touch, and thus when this region of the touch control module 18 adjacent to the upper side of the inner edge 141 of the opening 140 is set as the touch invalid region and configured to dispose the light emitting unit 11, the function settings of other regions of the touch control module 18 are less affected. In this embodiment, the light emitting unit 11 includes a light-emitting diode (LED), but the disclosure is not limited thereto.

In FIG. 3A and FIG. 3B, the light guiding layer 21 located between the touch control module 18 and the protecting layer 13 transmits light emitted by the light emitting unit 11. The reflecting layer 23 located between the touch control module 18 and the light guiding layer 21 reflects the light received from the light guiding layer 21 toward the light guiding layer 21.

In FIG. 2, FIG. 3A and FIG. 3B, the light shielding structure 25 is connected between the touch control module 18 and the protecting layer 13, and is surrounding the reflecting layer 23, the light guiding layer 21 and the light emitting unit 11. In one embodiment, the light shielding structure 25 absorbs the light emitted by the light emitting unit 11. Therefore, the light shielding structure 25 prevent the light emitted by the light emitting unit 11 from being exposed to the outside of the second body 12 via the opening 140 of the top plate 142, thereby avoiding the problem of light leakage of the light emitting unit 11. In this embodiment, the light shielding structure 25 is separated from the reflecting layer 23, the light guiding layer 21 and the light emitting unit 11. In the case 14 of this embodiment, the light emitting unit 11 and the reflecting layer 23 are interlacedly disposed in the case 14 along the direction D2 and the reflecting layer 23 and the light guiding layer 21 are also interlacedly disposed in the case 14 along the direction D2. Therefore, the thickness of the electronic device 1 in the direction D1 is reduced, thereby reducing the size of the electronic device 1 and being convenient for the user to carry.

In some embodiments, the light shielding structure 25 includes a substrate and light absorbing particles. The light absorbing particles of the light shielding structure 25 are uniformly distributed in the substrate. In some embodiments, the material of the substrate of the light shielding structure 25 is a photosensitive interlayer material, and the photosensitive interlayer material is not limited to a positive or negative photosensitive mechanism. In an embodiment, the material of the substrate of the light shielding structure 25 includes a polymer material. In an embodiment, the material of the substrate of the light shielding structure 25 includes polycarbonate (PC). In an embodiment, the material of the substrate of the light shielding structure 25 is polyimide (PI), polyvinyl alcohol (PVA) or any other suitable material. In an embodiment, the material of the substrate of the light shielding structure 25 is also acrylate, but the disclosure is not limited thereto. In some embodiments, the light absorbing particles in the light shielding structure 25 include carbon, a black dye or any other suitable material.

Figure 4:
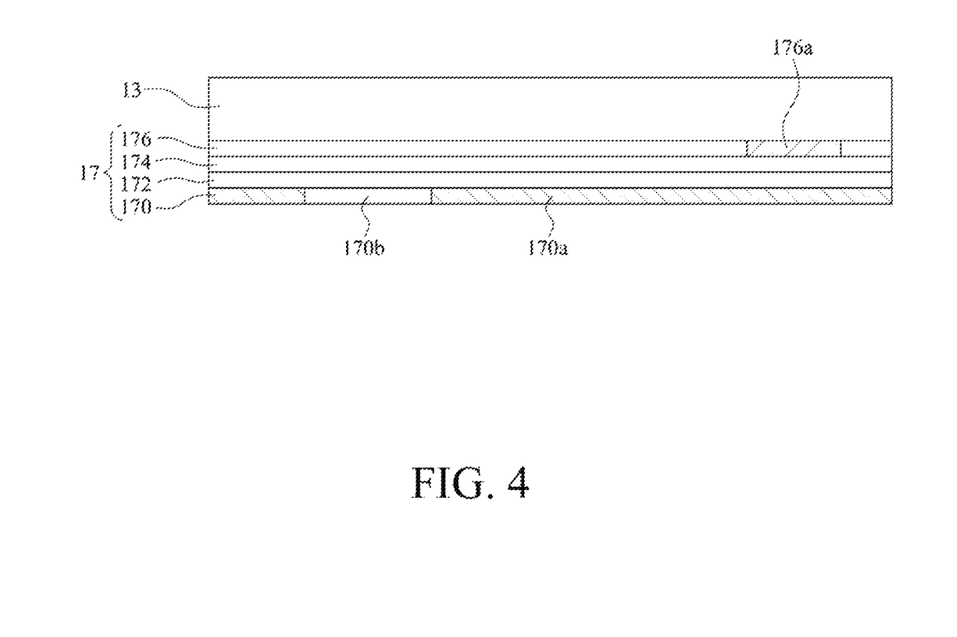
FIG. 4 shows a cross-sectional view of a protecting layer and a patterned stacked structure in an electronic device according to an embodiment of the disclosure.

Refer to FIG. 3A, FIG. 3B and FIG. 4. FIG. 4 shows a cross-sectional view of a protecting layer 13 and a patterned stacked structure 17 in an electronic device 1 according to an embodiment of the disclosure. As shown in FIG. 3A and FIG. 3B, the protecting layer 13 is stacked on the touch control module 18 and separated from the case 14. The protecting layer 13 is exposed to the opening 140 of the case 14 for the user to touch or press. In this embodiment, the protecting layer 13, the patterned stacked structure 17, the light guiding layer 21 and the reflecting layer 23 are sequentially stacked on the touch control module 18 from top to bottom. In this embodiment, the touch control module 18 is connected to the supporting structure 16, such that the supporting structure 16 supports the touch control structure 18 and the reflecting layer 23, the light guiding layer 21, the patterned stacked structure 17 and the protecting layer 13 that are stacked on the touch control module 18. In some embodiments, as shown in FIG. 2, the protecting layer 13 has button regions 13L and 13R and a cursor region 13S, and the button regions 13L and 13R and the cursor region 13S receive the pressure of the user to generate a signal, but the disclosure is not limited thereto. The user operates the movement of the cursor in the cursor region 13S, touches the button region 13L to perform a function similar to pressing a left mouse button, and touches the button region 13R to perform a function similar to pressing a right mouse button.

In some embodiments, the material of the protecting layer 13 includes mylar. In some embodiments, the material of the protecting layer 13 includes soda-lime glass, aluminosilicate glass or any other suitable material. In this embodiment, the protecting layer 13 is transparent under visible light and infrared rays. In some embodiments, the material of the protecting layer 13 includes a reactive silane group, a fluorine modified organic group, any other suitable material, or any combination of the foregoing.

As shown in FIG. 4, the patterned stacked structure 17 is located between the light guiding layer 21 (see FIG. 3A and FIG. 3B) and the protecting layer 13. In this embodiment, the patterned stacked structure 17 sequentially includes a first pattern layer 170, a color difference adjustment layer 172, a decorative layer 174 and a second pattern layer 176 that are sequentially stacked from a side adjacent to the light guiding layer 21 to a side adjacent to the protecting layer 13. In an embodiment, the first pattern layer 170 is located between the color difference adjustment layer 172 and the touch control module 18, and the decorative layer 174 is located between the color difference adjustment layer 172 and the protecting layer 13.

In this embodiment, the first pattern layer 170 has a pattern region 170a and a non-pattern region 170b. In an embodiment, the pattern region 170a of the first pattern layer 170 absorbs light to achieve the effect of shielding light when the light emitting unit 11 emits light. In an embodiment, light passes through the non-pattern region 170b of the first pattern layer 170 when the light emitting unit 11 emits light. Therefore, in a viewing angle perpendicular to the protecting layer 13, a pattern of the pattern region 170a of the first pattern layer 170 is displayed through the protecting layer 13 when the light emitting unit 11 emits light. In this embodiment, the pattern of the first pattern layer 170 is similar to a digital input region of the keyboard, but the disclosure is not limited thereto.

Figure 5A:
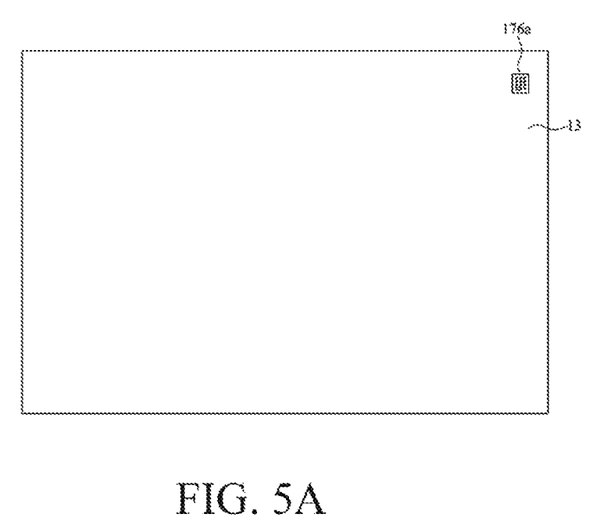
FIG. 5A and FIG. 5B respectively show partial structure top views of an electronic device at a viewing angle perpendicular to a protecting layer according to an embodiment of the disclosure.
Figure 5B:
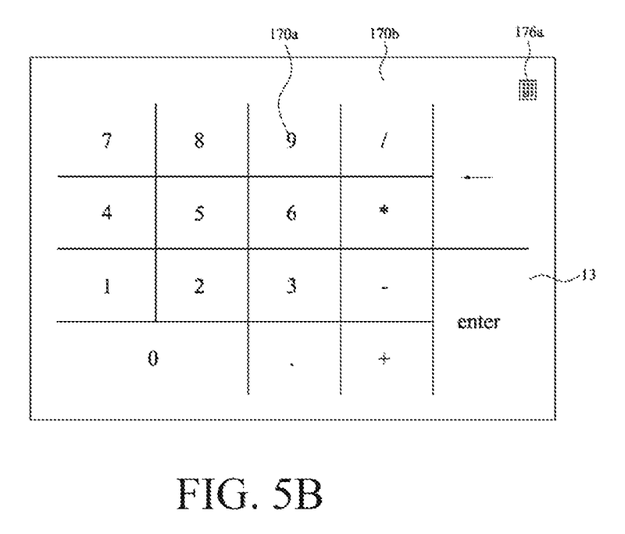

Refer to FIG. 5A and FIG. 5B. As shown in FIG. 5A, in a viewing angle perpendicular to the protecting layer 13, the protecting layer 13 does not display the pattern of the first pattern layer 170 (see FIG. 4) when the light emitting unit 11 does not emit light. In contrast, as shown in FIG. 5B, in a viewing angle perpendicular to the protecting layer 13, the protecting layer 13 displays the pattern of the first pattern layer 170 (see FIG. 4) when the light emitting unit 11 emits light. In some embodiments, the first pattern layer 170 of the patterned stacked structure 17 includes an opaque ink. In some embodiments, the color of the opaque ink is masking black.

As shown in FIG. 4, the color difference adjustment layer 172 of the patterned stacked structure 17 is disposed between the first pattern layer 170 and the decorative layer 174. In a viewing angle perpendicular to protecting layer, When the light emitting unit 11 does not emit light, the color difference adjustment layer 172 makes the pattern region 170a and the non-pattern region 170b to have the same color hue represented on the decorative layer 174 13. In other words, when the light emitting unit 11 does not emit light, the color difference adjustment layer 172 hides the pattern region 170a of the first pattern layer 170. In contrast, when the light emitting unit 11 emits light, an opaque ink formed on the color difference adjustment layer 172 shields the light from the non-pattern region 170b to display the pattern of the pattern region 170a. In some embodiments, the aforementioned opaque ink is in the form of masking gray, thereby avoiding the phase shift or shading shift of the decorative layer 174 located above.

As shown in FIG. 4, in a viewing angle perpendicular to the protecting layer 13, the decorative layer 174 of the patterned stacked structure 17 various the color hue of the first pattern layer 170 and the color hue of difference adjustment layer 172 to be the same as the color hue of the top plate 142 (see FIG. 3A and FIG. 3B) of the case 14, such that the appearance of the second body 12 has the same hue, thereby improving the appearance of the second body 12. In some embodiments, the decorative layer 174 of the patterned stacked structure 17 includes a translucent ink. In some embodiments, the translucent ink includes silver powder particles. And, the particle size of the silver powder particles is less than about 5 microns (μm) to prevent the user from seeing the aggregation of the silver powder particles through the protecting layer 13 when the light emitting unit 11 emits light, thereby improving the appearance of the second body 12 at the time of use.

In an embodiment, in a viewing angle perpendicular to the protecting layer 13, the pattern of the second pattern layer 176 of the patterned stacked structure 17 is always displayed through the protecting layer 13 whether the light emitting unit 11 emits light or not. In this embodiment, the pattern of the second pattern layer 176 is a keyboard pattern 176a for activating a keyboard function, but the disclosure is not limited thereto. The keyboard pattern 176a on the second pattern layer 176 is disposed adjacent to the connecting portion 166 and located at a corner of the second pattern layer 176 to avoid affecting the operation of the touch control module 18.

In this embodiment, when the user touches or approaches the position of the protecting layer 13 corresponding to the keyboard pattern 176a of the second pattern layer 176, the light emitting unit 11 and the touch control module 18 activate related functions. Therefore, in a viewing angle perpendicular to the protecting layer 13, the pattern of the first pattern layer 170 are displayed through the protecting layer 13 when the light emitting unit 11 emits light. In an embodiment, when the number key patterns of the first pattern layer 170 are displayed through the protecting layer 13 (see FIG. 5B), the touch control module 18 is switched to have number key function. Then, when the user touches or approaches the position of the protecting layer 13 corresponding to the number key pattern of the first pattern layer 170, the touch control module 18 transmits a corresponding signal to a processor in the electronic device 1 for subsequent corresponding signal processing.

In some embodiments, the second pattern layer 176 of the patterned stacked structure 17 includes an opaque ink. In some embodiments, the color of the opaque ink is masking black. In some embodiments, every adjacent two of the first pattern layer 170, the color difference adjustment layer 172, the decorative layer 174 and the second pattern layer 176 are bonded to each other by an optical adhesive.

Figure 7A:
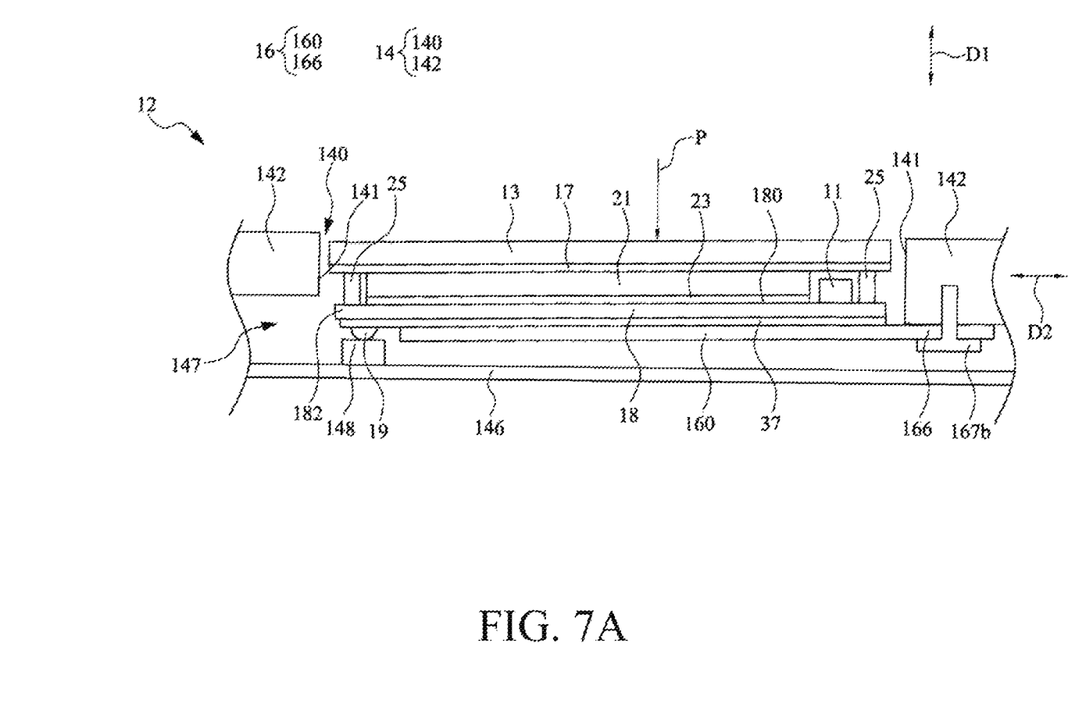
FIG. 7A and FIG. 7B are respectively cross-sectional views of the protecting layer in FIG. 3A and FIG. 3B under pressure.
Figure 7B:
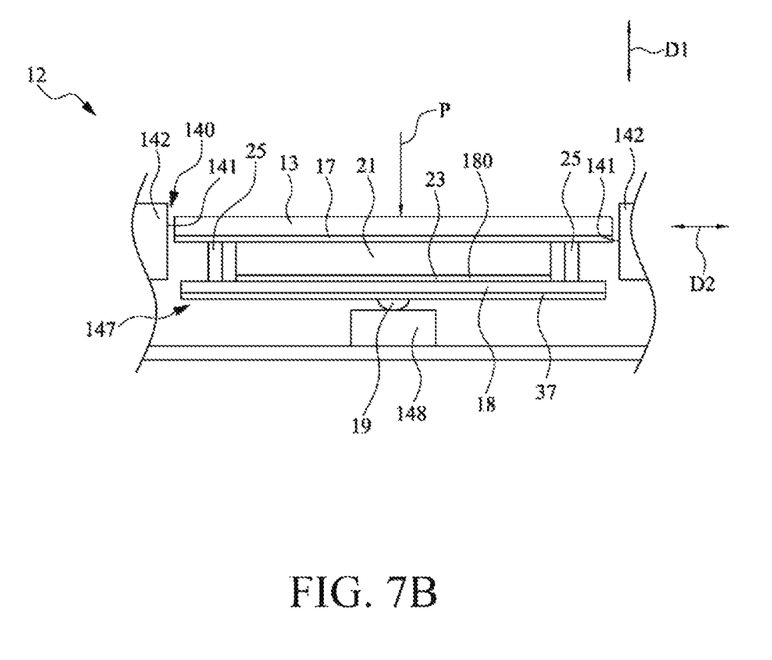

In FIG. 3A and FIG. 3B, the elastic switch 19 is disposed on the surface of the touch control module 18 back onto the opening 140. In detail, the elastic switch 19 is disposed on a butting portion 182 of the touch control module 18. In this embodiment, the elastic switch 19 is a metal dome, but the disclosure is not limited thereto. In this embodiment, when the elastic switch 19 is not pressed, a circuit on the touch control module 18 is in a non-conducting state. In contrast, when the elastic switch 19 is pressed as shown in FIG. 7A and FIG. 7B, the elastic switch 19 conducts the circuit on the touch control module 18, such that the touch control module 18 transmits the signal to the motherboard for subsequent corresponding signal processing.

Figure 6:
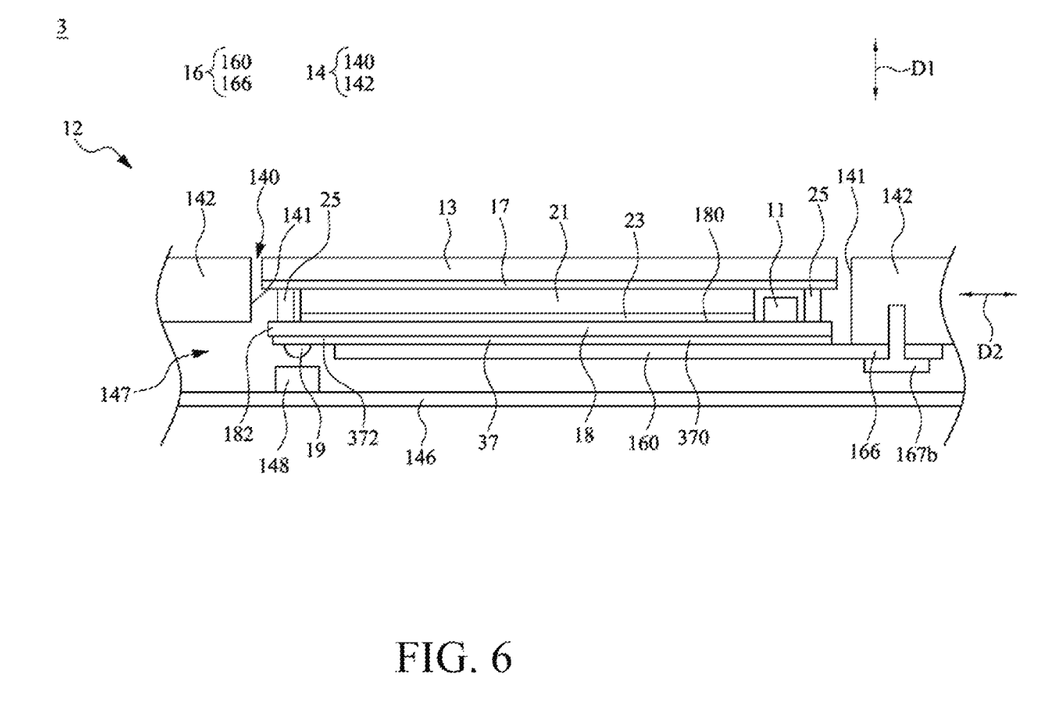
FIG. 6 shows a cross-sectional view of an electronic device taken along line segment 3A-3A as shown in FIG. 3A according to another embodiment of the disclosure.

Refer to FIG. 6. FIG. 6 shows a cross-sectional view of an electronic device 3 taken along line segment 3A-3A shown in FIG. 3A according to another embodiment of the disclosure. The electronic device 3 of this embodiment includes a first body 10 and a second body 12 that are pivotally connected to each other as shown in FIG. 1. The structure and function of these elements and the connection relationship between the elements are substantially the same as those of the electronic device 1 shown in FIG. 1 to FIG. 4. Therefore, reference may be made to the above-mentioned related description, and details are not described herein again.

It is to be noted here that the difference between this embodiment and the embodiment shown in FIG. 1 to FIG. 4 is that, in this embodiment, the electronic device 3 further includes a heat dissipation layer 37. As shown in FIG. 6, the heat dissipation layer 37 includes a first heat dissipation region 370 and a second heat dissipation region 372 that are connected to each other. The first heat dissipation region 370 of the heat dissipation layer 37 is disposed between the supporting structure 16 and the touch control module 18. The second heat dissipation region 372 of the heat dissipation layer 37 protrudes from the bottom plate 160 of the supporting structure 16 toward a direction away from the connecting portion 166, and the second heat dissipation region 372 is disposed between the elastic switch 19 and the touch control module 18.

Thereby, the heat dissipation layer 37 uniformly dissipate heat generated by the light emitting unit 11 to decrease the temperature of a position of the second body 12 adjacent to the light emitting unit 11. Therefore, under the condition of the foregoing structure, it is allowed to dispose more light emitting units 11 on the touch control module 18, such that light transmitted from the protecting layer 13 is more saturated and/or more varied. In this embodiment, the material of the heat dissipation layer 37 includes graphite, but the disclosure is not limited thereto.

Refer to FIG. 7A and FIG. 7B. FIG. 7A and FIG. 7B are respectively cross-sectional views of the protecting layer 13 in FIG. 3A and FIG. 3B under pressure P. As shown in FIG. 7A and FIG. 7B, in this embodiment, the user presses the protecting layer 13 exposed to the opening 140 of the case 14. When the protecting layer 13 takes the pressure P, the patterned stacked structure 17, the light guiding layer 21, the reflecting layer 23, the light shielding structure 25, the touch control module 18 and the supporting structure 16 located below the protecting layer 13 also take the pressure P, such that the connecting portion 166 (see FIG. 7A) of the supporting structure 16 is flexed.

Then, a part of the bottom plate 160 of the supporting structure 16 opposite to the connecting portion 166 moves away from the opening 140 and toward the base 146 of the case 14, such that the elastic switch 19 disposed on the bottom plate 160 is pressed between the bottom plate 160 of the supporting structure 16 and the pressing member 148 of the case 14. When the elastic switch 19 is pressed, the elastic switch 19 conducts the circuit on the touch control module 18, such that the touch control module 18 transmits a corresponding signal to the motherboard for subsequent corresponding signal processing.

Since the elastic switch 19 of the disclosure is disposed below the protecting layer 13, the protecting layer 13 moves close to the base 146 by the supporting structure 16 to give physical feedback corresponding to the user's pressure when the user presses the protecting layer 13. Besides, the user is able to perform a touch operation on the protecting layer 13 to move the cursor, the user also is able to press a key displayed on the protecting layer 13 to trigger the function corresponding to the key. Moreover, the elastic switch 19 of the disclosure is disposed below the protecting layer 13 instead of being disposed on the top plate 142 located on the periphery of the protecting layer 13, thereby reducing the time and cost required for the assembly of the electronic device 1. In addition, the space below the protecting layer 13 is effectively utilized, thereby reducing the size of the electronic device 1 and being convenient for the user to carry.

From the above detailed description of the specific embodiments of the disclosure, it can be clearly seen that since the light emitting unit of the disclosure is located between the protecting layer and the touch module, the space below the protecting layer is effectively utilized, thereby reducing the size of the electronic device and being convenient for the user to carry. Moreover, the light emitting unit of the disclosure is located between the protecting layer and the touch module instead of being disposed on the periphery of the touch module. Therefore, it is allowed that the light emitting units is mounted on the touch module in advance, and then the touch module with the light emitting units is mounted in the case of the second body, thereby reducing the time and cost required for the assembly of the electronic device.

Furthermore, the heat dissipation layer of the disclosure is able to uniformly dissipate heat generated by the light emitting unit thereon to lower the temperature of a position of the second body 12 adjacent to the light emitting units. Therefore, under the condition of the foregoing structure, it is allowed to dispose more light emitting units on the touch module, such that light transmitted from the protecting layer is more saturated and/or more varied.

Features of the multiple embodiments described above enable persons of ordinary skill in the art to better understand the embodiments of the disclosure. Persons of ordinary skill in the art should understand that, to achieve the same objective and/or same advantage of the embodiments of disclosure, designs or modifications involving other processes or structures based on the disclosure are obvious. Persons of ordinary skill in the art should also understand that, these equivalent structures do not depart from the spirit and scope of the disclosure, and various changes, replacement, and amendments can be made without departing from the spirit and scope of the disclosure.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. An electronic device, comprising:
   a case, comprising a top plate and having an opening formed on the top plate;
   a supporting structure, extending from a bottom surface of the top plate across a first edge of the opening and terminating prior to reaching a second edge of the opening opposite to the first edge;
   a touch module, disposed above to the supporting structure;
   a protecting layer, stacked above the touch module, embedded in the opening, and spaced apart the case;
   a switch disposed on a surface of the supporting structure opposite to the protecting layer and overlapping the opening; and
   at least one light emitting unit, disposed between the touch module and the protecting layer.

2. The electronic device according to claim 1, further comprising a light guiding layer located between the touch module and the protecting layer and transmitting light emitted by the light emitting unit.

3. The electronic device according to claim 2, further comprising a reflecting layer located between the touch module and the light guiding layer.

4. The electronic device according to claim 1, wherein the number of the at least one light emitting unit is plural, and the plurality of light emitting units are arranged along an inner edge of the opening.

5. The electronic device according to claim 1, wherein the at least one light emitting unit is located within an inner edge of the opening.

6. The electronic device according to claim 1, wherein the light emitting unit is located above a top surface of the touch module.

7. The electronic device according to claim 1, further comprising a pattern stacked structure comprising a pattern layer and a color difference adjustment layer stacked each other, the pattern layer being located between the touch module and the color difference adjustment layer.

8. The electronic device according to claim 7, wherein the pattern stacked structure further comprises a decorative layer located between the color difference adjustment layer and the protecting layer.

9. The electronic device according to claim 1, wherein the elastic switch is a metal dome, and when the supporting structure moves partially away from the opening, the metal dome is pressed between the supporting structure and the case.

10. The electronic device according to claim 9, wherein the elastic switch is a metal dome, and the metal dome and the light emitting unit are located on two opposite sides of the touch module.

11. The electronic device according to claim 1, further comprising a light shielding structure located between the touch module and the protecting layer and surrounding the light emitting unit.

12. The electronic device according to claim 1, further comprising a heat dissipation layer disposed between the supporting structure and the touch module.

* * * * *